Figure 1:
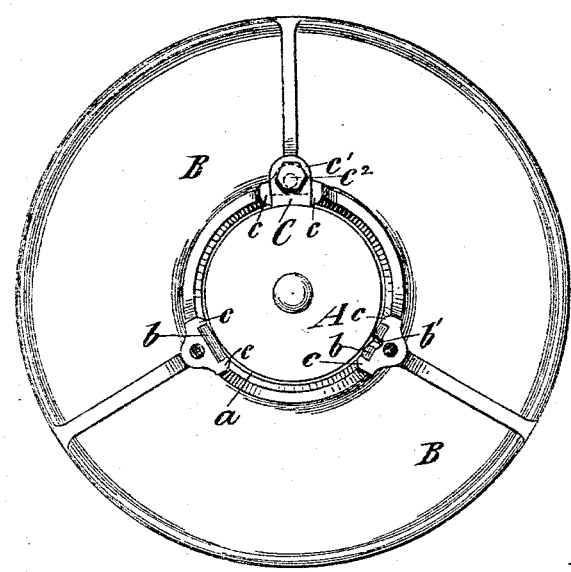

(No Model.)

I. E. PALMER.
MEANS FOR SECURING BEAM HEADS UPON BEAM BARRELS.

No. 321,635. Patented July 7, 1885.

Witnesses
Inventor
Isaac E. Palmer
by his Attorneys
Brown & Hall

United States Patent Office.

ISAAC E. PALMER, OF MIDDLETOWN, CONNECTICUT.

MEANS FOR SECURING BEAM-HEADS UPON BEAM-BARRELS.

SPECIFICATION forming part of Letters Patent No. 321,635, dated July 7, 1885.

Application filed January 19, 1884. (No model.)

*To all whom it may concern:*

Be it known that I, ISAAC E. PALMER, of Middletown, in the county of Middlesex and State of Connecticut, have invented a new and useful Improvement in Means for Securing Beam-Heads upon Beam-Barrels, &c., of which the following is a specification.

The invention is more particularly intended for securing beam-heads upon beam-barrels for looms and other machines in which are employed wood beam-barrels having cast-metal heads; but the invention may be also employed for securing pulleys or gear-wheels on such beam-barrels at any point desired in their length. The beam-head commonly employed consists of a plain flange of cast-metal, having a thin light hub, which is bored out and slipped on the wood beam-barrel and there secured by screws or other means. It is exceedingly difficult to secure such a head on a beam-barrel from which it has been removed, so that it will stand and run truly relatively to the axis of the beam, and the very operation or means employed to secure the head mutilate and gall the beam-barrel to such an extent as to render it practically impossible to properly secure a head thereon after heads have been many times secured thereon and removed therefrom.

An important object of my invention is to provide means whereby the beam-head or a pulley or wheel may be secured at any desired point in the length of the beam-barrel or shaft, and whereby the head or wheel may be quickly adjusted and truly secured on said barrel or shaft without regard to the exact size of the latter and however much it may be out of truth, and also without any necessity of boring out the head or wheel.

The invention consists in the combination, with a beam-barrel or shaft, of a head or wheel having a central aperture loosely receiving the barrel or shaft and provided at different points in its circumference with inclined wedge-seats, a number of wedges adapted to said seats, and screws or bolts connecting the several wedges with the head or wheel and capable of adjustment independently of each other. At least three wedges are necessary for securing the desired result; but a greater number may be employed, if desired. The head or wheel may be secured upon the barrel or shaft in position to run truly by adjusting the several screws or bolts—one for each wedge. When the friction between the wedge and the barrel or shaft is less than that between the wedge and wedge-seat, the wedge will be moved on the barrel or shaft by turning its screw; but when the friction is greater between the wedge and the barrel or shaft than between the wedge and wedge-seat, the head or wheel will be drawn upon the wedge by turning its screw or bolt.

I provide inwardly-projecting lips or ribs on opposite sides of each wedge-seat, to hold the wedges in proper position and to enable a lighter head or wheel to be made than would be the case if the wedges fitted in grooves, the internal diameter of the hub or eye of the head or wheel being less at a point between the grooves than in the grooves. This construction is included in my invention.

Figure 2:
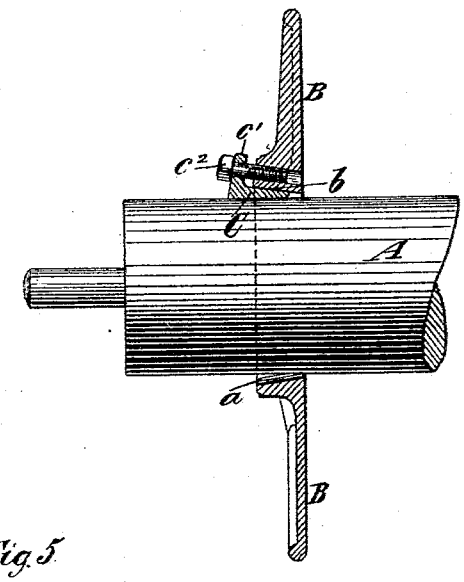
Figure 3:
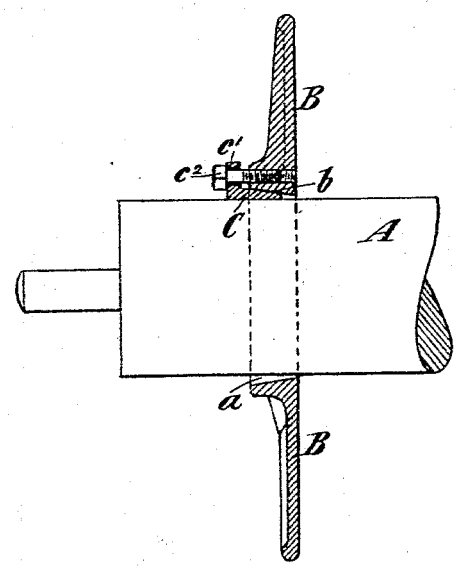
Figure 5:
Figure 4:
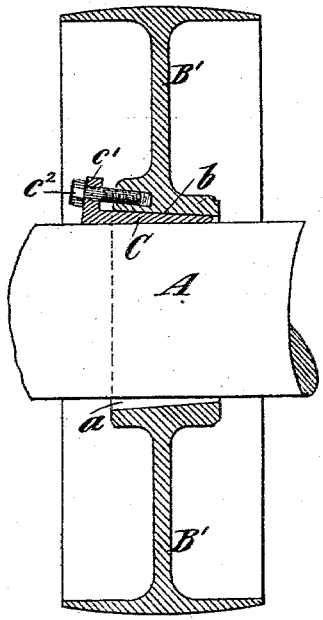

In the accompanying drawings, Figure 1 is an end view of a beam and head embodying my invention, three wedges only being used and all but one being removed. Fig. 2 is a side view of one end portion of the beam-barrel and a sectional view of one head and one wedge, the screw for the latter being in elevation. Fig. 3 is a view similar to Fig. 2, but illustrating a modification of my invention. Fig. 4 is a side view of one end portion of a beam-barrel and a sectional view of a pulley secured thereon according to my invention, and Fig. 5 is a perspective view of a wedge of modified form.

Similar letters of reference denote corresponding parts in all the figures.

A designates the beam-barrel or shaft, which is usually of wood and of cylinder form, and B designates one of the heads, which is of cast metal. The head B has a central aperture, *a*, large enough to slip very loosely over the barrel, it being sufficiently larger than the barrel to dispense with any boring of the head.

In the inner circumference of the head, or rather in the wall of the aperture *a*, are formed a number of seats, *b*, which are inclined in the direction of the length of the beam-barrel A; and C designates wedges, which are introduced between the inclined seats $b$ and the barrel A. I have here shown three wedges, C, and of course the head B has formed in it a corresponding number of seats, $b$; but more than three wedges, placed equidistant around the circumference of the barrel, may be employed.

In order to hold the wedges C in position laterally relatively to the seats $b$, I have shown the head B as having little lips or ribs $c$, which project inward on opposite sides of each seat $b$, and between which the wedges C are received.

In Fig. 1 I have shown one of the seats $b$ as formed with a little V-shaped groove, $b'$, and the wedge would then have a corresponding rib entering said groove. In Fig. 5 I have illustrated a wedge having such a rib, $b^*$. The groove $b'$ and a rib on the wedge may be employed in addition to the lips or ribs $c$ or as a substitute therefor. Each wedge C has an outwardly-projecting lug or ear, $c'$, and is connected with the head B by a screw or bolt, $c^2$, passing through said lug or ear and entering the head.

In Fig. 2 the screw $c^2$ is shown as extending parallel with the inclined seat $b$, and the lug or ear $c'$ is at right angles thereto; but in Fig. 3 the lug or ear is at right angles to the bottom of the wedge. In the latter case the screw or bolt $c^2$ should pass through a slotted hole in the lug or ear, as is shown in Fig. 3.

The operation of securing the head B is very simple. The wedges C are placed nearly in line circumferentially around the barrel, and by tightening the screws $c^2$ the head B is drawn up tightly on the wedges. By tightening the several screws $c^2$, as may be desired, the head can be brought to a true position at right angles to the axis of the barrel, and will be there held securely, even though the circumference of the barrel be worn and out of truth relatively to the axis.

The means employed for securing the head in place also provides for securing the head at any point desired in the length of the barrel. In some cases the screws might serve to adjust the wedges into the head; but in any case the head will be adjusted to or by the wedges by the act of turning the screws. The same means may be employed to secure a pulley or gear-wheel on the barrel, if desired.

In Fig. 4 I have shown a pulley, B', having in its hub inclined seats $b$, to which are applied wedges C, as before described. These wedges are connected by screws $c^2$ with the hub of the pulley, and by tightening them the pulley may be drawn upon the wedges and thus secured on the barrel A. When the pulley B' or a wheel is thus secured on the beam barrel or shaft, the boring out of the pulley is not necessary.

I am aware that it is not new to clamp a cam upon a shaft by a single wedge inserted into a recess in the cam and tightened therein by a bolt; and I am also aware that it is not new to secure a wheel or pulley on a shaft by means of three wedges at equidistant points in the circumference thereof, and adapted to be tightened simultaneously by a cap-nut screwed upon the hub of the wheel or pulley and bearing on the larger ends of the wedges.

I do not claim either of the constructions above described as included in my invention. When a single wedge only is used, it only serves the purpose of a key to tighten a truly-bored cam on a truly-turned shaft, and when a number of wedges are adjusted simultaneously the wheel or pulley will not be truly secured unless the shaft is truly turned and the wedge-seats and wedges carefully finished and fitted to each other. According to my invention no such careful and costly construction is necessary, and a wheel or head having wedge-seats which are formed complete in casting may be secured on a rough shaft or wood barrel by wedges which have not finished surfaces.

What I claim as my invention, and desire to secure by Letters Patent, is—

1. The combination, with a beam-barrel or shaft, of a head or wheel having a central aperture loosely receiving the shaft, and provided at different points in its circumference with inclined wedge-seats, a number of wedges adapted to said seats, and screws or bolts connecting the several wedges with the head or wheel, and capable of adjustment independently of each other, whereby provision is afforded for securing the head or wheel truly upon said barrel or shaft, substantially as herein described.

2. The combination, with the beam-head B, having the central aperture, $a$, and inclined wedge-seats $b$, provided on opposite sides with lips or ribs $c$, of the wedges C and screws $c^2$, capable of independent adjustment, substantially as and for the purpose herein described.

I. E. PALMER.

Witnesses:
FREDK. HAYNES,
HARRY BOGERT.